United States Patent Office 3,159,687
Patented Dec. 1, 1964

3,159,687
ISOMERIZATION OF ALKYL BENZENES
Leon M. Lehman, Brooklyn, N.Y., assignor, by mesne assignments, to Sinclair Research, Inc., New York, N.Y., a corporation of Delaware
No Drawing. Filed Sept. 6, 1961, Ser. No. 136,161
6 Claims. (Cl. 260—668)

This invention is a method for isomerization of alkyl benzenes which serves the further purpose of recovering hydrogen from its mixture with other gases.

Two of the currently most valuable by-products sought in petroleum refining are paraxylene and durene, which are produced in many refining procedures in admixture with their isomers, ortho- and metaxylene and ethylbenzene on the one hand, and isodurene on the other hand. Procedures have been developed for the removal of paraxylene or durene from such mixtures, usually by crystallization, and such procedures generally leave a mother liquor containing the other $C_8$ or $C_{10}$ aromatic constituents. In this invention these paraxylene- or durene-slack mother liquors are isomerized to produce further quantities of the desired isomers which are removed by crystallization.

In this invention a hydrogen-containing gas mixture is sent with the substantially paraxylene- or durene-slack mother liquor in contact with a hydrogenation catalyst at the proper conditions for hydrogenation of the $C_8$ or $C_{10}$ aromatics to cycloparaffins. These resulting naphthenes are sepaarted from the unreacted gas and then passed over a catalyst under dehydrogenation conditions to produce an aromatic hydrocarbon mixture which contains significant and recoverable amounts of paraxylene or durene. The dehydrogenation also produces a stream of hydrogen of high purity at a relatively high pressure. Thus, this invention provides for the economic separation of hydrogen from light hydrocarbon gases. By conventional methods for such separation, such as distillation, the separation of hydrogen from its mixture with methane and ethane, for example, in a cracker effluent, is extremely tedious and costly. Further the technique described in U.S. Patent 2,328,828 which employs an unsubstituted benzene or other aromatic for reaction with hydrogen in an impure mixture is disadvantageous in that either a reaction zone separate from the hydrocarbon treating zone must be employed for removal of hydrogen from the aromatic "carrier," or else this aromatic carrier must be included in the main reaction zone, reducing the capacity of the unit for production of valuable end products.

Another advantage of the process of this invention is that it is possible to produce high pressure hydrogen from a gas stream at lower pressure without expensive gas compression. The hydrogen-containing gas mixture, as will be seen below, may be used for hydrogenation at a pressure of about 50–200 p.s.i.g. with a gas containing say, about 50% hydrogen. The partial pressure of the hydrogen in the gas fed to the reaction need be only about 25–50 p.s.i.g. The resulting naphthenes are cooled, if necessary, to a liquid and the liquid pumped to a higher pressure. At the higher pressure the naphthenes can then be vaporized and heated to dehydrogenation temperatures. Dehydrogenation may take place at a higher pressure than hydrogenation, preferably a pressure of about 200–1000 p.s.i.g. and at least about 50 p.s.i.g. higher than the hydrogenation pressure. For example, a gas containing about 85% hydrogen released from this reaction will have a hydrogen partial pressure of about 170–850 p.s.i.g., a great gain in pressure achieved without the need for expensive gas compression. Thus, the process gives a gas richer in hydrogen and usually having a hydrogen partial pressure at least about 30 to 200 p.s.i.g. greater than the hydrogen partial pressure in the feed gas, preferably about 90 to 800 p.s.i.g. greater than the hydrogen partial pressure in the feed gas. The increase in hydrogen pressure may be as high as about 1800 p.s.i.g. The hydrogen yielded in the dehydrogenation aids the isomerization of the $C_8$ or $C_{10}$ aromatics.

In this invention paraxylene or durene is crystallized from a mixture of $C_8$ or $C_{10}$ aromatic isomers containing equilibrium or near-equilibrium amounts of the isomers and the crystals are removed from the mother liquor. This slack liquor stream contains less than the equilibrium amount of durene or paraxylene, an equilibrium mixture being the composition produced by isomerizing the alkyl benzene. This mother liquor stream is sent to a hydrogenation zone generally in the vapor phase where it is contacted with a hydrogenation catalyst and an impure hydrogen-containing gas at an elevated temperature to convert the alkyl benzenes of the mother liquor to their corresponding alkyl cyclohexanes.

After the hydrogenation reaction is complete, the mixture of alkylcyclohexanes and light hydrogen gases is cooled to condense the naphthenes. The cooling may be performed at atmospheric or slightly elevated pressures, or a vacuum may be applied to insure removal of substantially all the entrained light hydrocarbon gases, to give a greater purity to the hydrogen released in the subsequent dehydrogenation to which the alkyl cyclohexanes are sent. The naphthenes may be pressured in the liquid phase, if necessary, and are sent to the dehydrogenation zone in the vapor phase to contact a dehydrogenation catalyst. Isomerization as well as dehydrogenation occurs in this zone to produce a vapor mixture of hydrogen and an about-equilibrium mixture of alkylbenzene isomers. The effluent from this reaction zone may be sent to a flashing chamber for condensation of the dialkyl benzenes or tetraalkyl benzene. The hydrogen is removed—it may be 98% or more pure—and sent to storage or use.

The alkyl benzene mixture is sent to crystallization of the paraxylene or durene, perhaps in admixture with further equilibrium alkylbenzene mixture, and the crystals recovered. The mother liquor, depleted in paraxylene or durene, is recycled to the hydrogenation reactor.

The gas used for hydrogenation may be that obtained as off-gas from a catalytic cracking of petroleum hydrocarbons, but is not limited to such. The hydrogen-rich gas will generally contain about 25 to 75% hydrogen in admixture with light, i.e., normally gaseous, hydrocarbons. The balance of the mixture, other than hydrogen will generally comprise ethane and methane; usually methane is the predominant portion of the balance, although propane and butane may also be present. This gas mixture may be obtained from petroleum processing at about the pressure used in the hydrogenation.

The hydrogenation reaction takes place in the liquid or vapor or mixed phase at a temperature of about 50–500° F., preferably 150 to 300° F., and a pressure of about 50–2000 p.s.i.g., preferably 50–200 p.s.i.g., but wider temperature and pressure ranges may be employed. The hydrogen-rich gas is fed to the reactor, preferably in admixture with the aromatic feedstock, in an amount sufficient to provide about 3 to 30 moles of hydrogen per mole of hydrocarbon fed to the hydrogenator, to convert the alkyl benzene in substantially quantitative yields to cyclohexanes.

The hydrogenation catalyst is generally employed as a fixed bed and may be any one of the solid metal-containing hydrogenation catalysts of known type. The catalyst contains catalytically active amounts of a hydrogenation promoting metal, for instance a heavy metal component such as those of metals having atomic numbers of about 23 to 28, the Group VIII catalysts of the iron group, molybdenum, tungsten and combinations therof. Frequently the metals are disposed as inorganic components, for instance oxides, sulfides or other compounds, supported on a solid carrier exemplified by alumina, silica, etc. Sometimes the catalyst contains a combination of metals of the iron group with vanadium or a metal of Group VIa of the periodic chart having atomic numbers from 42 to 74, i.e. molybdenum and tungsten. A commercial catalyst contains cobalt and molybdenum, e.g. cobalt molybdate, supported on alumina. The amount of catalytically active metal in supported catalysts is usually about 1 to 30 weight percent of the catalyst and preferably about 3 to 20 weight percent, with there being at least about 1%, preferably at least about 2%, of each catalytically active metal when combinations are used. Preferably a Raney nickel catalyst is used to minimize isomerization in this zone. This catalyst is a very finely divided nickel produced by dissolving out the light metal from a nickel-aluminum or nickel-magnesium alloy. Supported catalysts are generally calcined and used as a fixed bed of macrosized particles, say of about 1/8" to 1/4" in diameter and about 1/8" to 1" or more in length. A moving bed of macrosized catalyst or a fluidized bed of finely divided particles can be used.

The vaporous effluent from the hydrogenation zone is cooled to permit condensation of the alkyl cyclohexanes from the waste gases which have been depleted in their hydrogen content and are removed from the system. The naphthenes are sent in the vapor phase to a dehydrogenation zone.

The dehydrogenation-isomerization takes place generally at a temperature of about 700–1200° F. and about 50–2000 p.s.i.g., preferably about 800–1000° F. and about 200–1000 p.s.i.g. Since the operating pressure of the dehydrogenation reaction is determinative of the partial pressure of hydrogen in the gas recovered, it is advantageous to operate the dehydrogenation-isomerization reaction at the pressure at which the hydrogen rich gas will be stored and applied to further uses which generally is at least about 50 p.s.i.g. higher than the hydrogenation pressure, advantageously 75–800 p.s.i.g. higher. A WHSV of about 0.25–10 is preferred and additional free hydrogen may be included with the dimethylcyclohexane or tetramethylcyclohexane feed in a molar ratio of about 0.2 to 10 moles hydrogen per mole of hydrocarbon. Hydrogen recovered from this step may be used to supply the additional free hydrogen. Since the dehydrogenation-isomerization reaction is highly endothermic, it may often be advisable to conduct this combined reaction in a series of catalyst-containing vessels arranged in series, with heaters interposed in the lines between the reactors for assuring entry into each reactor of the reactants at the proper elevated temperature. Treatment of the hydrocarbon isomer mixture under these conditions causes isomerization to the desired isomer in preference to the others since their presence in excess of equilibrium amounts represses the formation of further amounts of these undesired constituents to produce an almost-equalibrium mixture of isomers.

The dehydrogenation may employ the same type of catalyst as the hydrogenation. Preferably, however, this reaction employs a noble or platinum group metal supported on an alumina base. This catalyst generally contains about 0.05 to 2 weight percent, preferably 0.1 to 1 weight percent, of one or more of the platinum metals of Group VIII, e.g., platinum, palladium, rhodium, ruthenium, osmium or iridium, with the metals having face centered cubes being preferred. The small amount of noble metal may be present in the metallic form or as a sulfide, oxide or other combined form. The metal may interact with other constituents of the catalyst, but if during use the noble metal be present in metallic form then it is preferred that it be so finely divided that it is not detectable by X-ray diffraction means, i.e. that it exists as crystals of less than about 50 Angstrom units size. Of the noble metals, platinum, palladium and rhodium are used most advantageously.

The noble metal is deposited on an absorptive alumina base of the activated or calcined type. The base is usually the major component of the catalyst, generally constituting at least about 75 weight percent on the basis of the catalyst, preferably at least about 80 to 90%. The catalyst base is an activated or gamma-alumina such as those derived by calcination of amorphous hydrous alumina, alumina monohydrate, alumina trihydrate or their mixtures. The catalyst base precursor most advantageously is a mixture predominating, for instance, about 65 to 95 weight percent, in one or more of the alumina trihydrates, bayerite I, bayerite II (randomite or nordstrandite) or gibbsite, and about 5 to 35 weight percent of alumina monohydrate (boehmite), amorphous hydrous alumina or their mixture. The alumina base can contain small amounts of other solid oxides such as silica, magnesia, natural or activated clays (such as kaolinite, montmorillonite, halloysite, etc.), titania, zirconia, etc., or their mixtures. A preferred catalyst contains platinum deposited on activated alumina having at least about 200 square meters per gram surface area before use.

An activated or gamma-alumina may be made by calcining a precursor predominating in alumina trihydrate. An alumina of this type is disclosed in U.S. Patent No. 2,838,444. The alumina base is derived from a precursor alumina hydrate composition containing about 65 to 95 weight percent of one or more of the alumina trihydrate forms gibbsite, bayerite I and bayerite II (randomite or nordstrandite) as defined by X-ray diffraction analysis. The substantial balance of the hydrate is amorphous hydrous or monohydrate alumina. Trihydrates are present as well defined crystallites; that is, they are crystalline in form when examined by X-ray diffraction means. The crystallite size of the precursor alumina trihydrate is relatively large and usually is in the 100 to 1000 Angstrom unit range. The calcined alumina has a large portion of its pore volume in the pore size range of about 100 to 1000 Angstrom units generally having about 0.1 to about 0.5 and preferably about 0.15 to about 0.3 cc./g. of pore volume in this range. As described in the patent the calcined catalyst base can be characterized by large surface area ranging from about 350 to about 550 or more square meters/gram when in the virgin state as determined, for example, by the BET adsorption technique. A low area catalyst base prepared by treating the predominantly trihydrate base precursor is described in U.S. Patent No. 2,838,445. This base, when in the virgin state, has substantially no pores of radius less than about 10 Angstrom units and the surface area of the catalyst base is less than about 350 square meters/gram and most advantageously in the range of about 150 to 300 square meters/gram.

The platinum group metal component of the catalyst can be added to the alumina base by known procedures. For instance, the platinum metal component can be deposited on a calcined or activated alumina, but it is preferred to add the platinum metal component to the alumina hydrate precursor. Thus platinum can be added through reaction of a halogen platinum acid, for instance, fluoro-, chloro-, bromo- or iodo-platinic acid, and hydrogen sulfide, in an aqueous slurry of the alumina hydrate. The hydrogen sulfide can be employed as a gas or an aqueous solution. Alternatively, the platinum component can be provided by mixing an aqueous platinum sulfide sol with alumina hydrate. This sol can be made by reaction in an aqueous medium of a halogen platinic acid with hydrogen sulfide. The alumina hydrate containing the platinum metal can be dried and calcined, usually at a temperature from about 750 to 1200° F. or more, to provide the activated or gamma-alumina modifications.

In addition to noble-metal catalysts, other hydrogenation catalysts such as molybdenum, tungsten, vanadium, tin, chromium, the Group VIII metals, for instance, iron, cobalt, nickel, and their oxides, sulfides and other combined forms may be used as described above. Mixtures of these materials or compounds or two or more of the oxides can be employed. Minor catalytic amounts usually less than about 10% to 20% and at least about 0.1% of these ingredients can be dispersed on or carried as promotors by solid materials such as charcoal, oxides, silicates or mixtures of oxides and silicates. The composite is usually calcined or activated after the promoting metal is added. Specific examples of suitable catalysts are cobalt-molybdena-on-alumina, nickel-tungsten oxide-on-alumina, nickel tungsten sulfide-on-alumina, cobalt-molybdena-on-silica-alumina, etc.

The catalyst can be easily regenerated employing conventional procedures, for instance, by subjecting it to an oxygen-containing gas at temperatures sufficient to burn off carbon deposited on the catalyst during the conversion of petroleum hydrocarbon feedstock. This oxygen-containing gas, e.g. an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

The dehydrogenator effluent is separated by condensation into relatively pure hydrogen at a pressure significantly higher, that is, at least about 30–200 p.s.i.g. higher, than the pressure of the hydrogen in the hydrogenation gas, and the liquid alkyl benzene isomer mixture containing the isomers in about equilibrium amounts. The hydrogen in the recovered gas is advantageously, as mentioned, about 90 to 800 p.s.i.g. higher in pressure than the partial pressure of hydrogen in the hydrogenation gas. The isomer mixture is sent to crystallization out of the paraxylene or durene by methods known to the art.

The following example of the process of this invention is not to be considered limiting.

A refinery has available 1,000,000 s.c.f.h. of a gas containing 50% hydrogen, 20% methane, and 30% ethane. It is desired to recover high purity hydrogen from this stream. In addition, 35 barrels per hour of residual xylenes are available containing 10% p-xylene. This stream is a filterate from which p-xylene has been removed by crystallization. It is desired to increase the p-xylene concentration by isomerization to permit further p-xylene recovery.

The hydrogen rich gas is obtained from a catalytic cracker at about 150 p.s.i.g. and about 250° F. The liquid xylene mixture which vaporizes at over 150° F. is raised to the 250° F. temperature and the two vapor streams are comingled and fed to a reactor at essentially 150 p.s.i.g. The reactor contains a Raney nickel catalyst as described above. In the reactor the xylenes are converted with 99+% yield to dimethylcyclohexanes. The reactor effluent is cooled to 100° F. and sent to a flash chamber. About 890,000 s.c.f.h. of gas go overhead. The bottoms are pumped to the dehydrogenation section. Here it is mixed with 36,500 s.c.f.h. of hydrogen recycle gas and heated to 950° F. A series of four reactors containing the platinum-alumina catalyst above described are provided. The dehydrogenator feed is fed to this section at about 950° F. and the effluent from each reactor is heated to 950° F. before going to the next reactor. The effluent from the last reactor is cooled and sent to a flash chamber operated at about 100° F. and 500 p.s.i.g. A gas containing 85% hydrogen is taken overhead and after the recycle gas is removed it amounts to 110,000 s.c.f.h. The hydrogen in this gas is at a partial pressure of about 425 p.s.i.g. compared to a pressure of about 75 p.s.i.g. in the gas mixture obtained from the refinery. The bottoms from the flash chamber comprise about 34 barrels per hour of an about-equilibrium mixture of xylenes, containing about 17–20% p-xylene. This mixture is blended with additional amounts of about-equilibrium xylene mixture from the conventional refinery operation and sent to a paraxylene crystallization and recovery system which employs cooling to crystallize the paraxylene, centrifugal filtration to separate the crystals from the bulk of the mother liquor and washing of the filter cake with liquid paraxylene to remove occluded mother liquor. The filtrate mother liquor from this recovery system contains about 10% p-xylene and is sent to the hydrogenation zone. The process results in an additional 2.4 to 3.4 barrels per hour of p-xylene from the refinery operations.

When the para-xylene mother liquor is replaced by durene mother liquor containing about 10% durene and the same hydrogenation, dehydrogenation-isomerization and durene crystallization and recovery techniques are applied, a significant increase in durene recovery is obtained along with the production of high-pressure hydrogen-rich gas.

It is claimed:

1. A method which comprises hydrogenating a feedstock consisting essentially of a mixture selected from the group consisting of xylene and durene isomer mixtures containing less than an equilibrium amount of a selected isomer, by contact of the feedstock with a gaseous mixture consisting essentially of light, normally gaseous hydrocarbons and about 25–75% hydrogen in the presence of a hydrogenation catalyst to obtain a mixture of alkyl-cyclohexanes and said light hydrocarbons, subjecting said alkylcyclohexanes to dehydrogenation-isomerization conditions in the presence of free hydrogen and a platinum-containing dehydrogenation-isomerization catalyst, recovering from the dehydrogenation-isomerization reaction a mixture of alkylbenzene isomers richer in said selected isomer than said feedstock and a gas containing hydrogen in a proportion greater than in said gaseous mixture and recovering said selected isomer from the recovered isomer mixture.

2. The method of claim 1 in which dehydrogenation-isomerization conditions include a pressure at least about 50 p.s.i.g. higher than the hydrogenation pressure and said alkyl cyclohexanes are brought to dehydrogenation-isomerization pressure by pumping said alkyl cyclohexanes as a liquid whereby the hydrogen-containing gases from the dehydrogenation-isomerization zone have a pressure greater than in the gaseous mixture passing to the hydrogenation reaction zone.

3. The method of claim 2 in which dehydrogenation-isomerization is conducted in the presence of a platinum-on-alumina catalyst.

4. The method of claim 3 in which hydrogenation is performed in the presence of a Raney nickel catalyst at a temperature of about 50–500° F. and a pressure of about 50–2000 p.s.i.g. on a vaporous reaction mixture which provides about 3 to 30 moles of hydrogen per mole of hydrocarbon fed to the hydrogenation reaction.

5. The method of claim 4 in which dehydrogenation-isomerization is performed at a temperature of about 770–1200° F. and a pressure of about 200–1000 p.s.i.g., on a vaporous feed mixture containing about 0.2 to 10 moles of hydrogen per mole of hydrocarbon fed to the hydrogenation reaction.

6. The method of claim 2 in which hydrogen recovered from the dehydrogenation-isomerization reaction is at a pressure at least about 30 to 800 p.s.i.g. higher than the pressure of the hydrogen in the hydrogenation gas, and the hydrogen from the dehydrogenation-isomerization reaction is passed to the hydrogenation zone without compression.

References Cited in the file of this patent
UNITED STATES PATENTS
2,885,451    Linn _____ May 5, 1959